United States Patent
Matsuyama et al.

(10) Patent No.: US 12,207,666 B2
(45) Date of Patent: Jan. 28, 2025

(54) GREEN TEA-CONTAINING BEVERAGE, METHOD FOR PREVENTING DISCOLORATION OF GREEN TEA-CONTAINING BEVERAGE, AND METHOD FOR MANUFACTURING GREEN TEA-CONTAINING BEVERAGE

(71) Applicant: TAKARA SHUZO CO., LTD., Kyoto (JP)

(72) Inventors: Momoko Matsuyama, Kyoto (JP); Manabu Osaki, Kyoto (JP)

(73) Assignee: TAKARA SHUZO CO., LTD., Kyoto (JP)

(*) Notice: Subject to any disclaimer, the term of this patent is extended or adjusted under 35 U.S.C. 154(b) by 938 days.

(21) Appl. No.: 17/281,440

(22) PCT Filed: Sep. 17, 2019

(86) PCT No.: PCT/JP2019/036359
§ 371 (c)(1),
(2) Date: Nov. 12, 2021

(87) PCT Pub. No.: WO2020/071106
PCT Pub. Date: Apr. 9, 2020

(65) Prior Publication Data
US 2022/0071225 A1  Mar. 10, 2022

(30) Foreign Application Priority Data

Oct. 5, 2018 (JP) ................... 2018-190081
Feb. 22, 2019 (JP) ................... 2019-030479
Jun. 24, 2019 (JP) ................... 2019-116633

(51) Int. Cl.
*A23F 3/14* (2006.01)

(52) U.S. Cl.
CPC ..................... *A23F 3/14* (2013.01)

(58) Field of Classification Search
CPC ........ A23V 2250/214; A23V 2250/156; A23V 2250/1588; A23V 2250/02; A23V 2250/04; A23V 2250/056; A23V 2200/04; A23F 3/16; A23F 3/40; A23F 3/34; A23F 5/02; A23F 3/14; A23F 3/405; A23L 33/105; A23L 2/52
See application file for complete search history.

(56) References Cited

U.S. PATENT DOCUMENTS 5,464,619 A * 11/1995 Kuznicki ............... A61K 36/82
424/439
2018/0070605 A1* 3/2018 Takatsu .................... A23L 2/38

FOREIGN PATENT DOCUMENTS

| JP | 39-21643 | 10/1964 | |
|---|---|---|---|
| JP | 62-19051 | 1/1987 | |
| JP | 7-112 | 1/1995 | |
| JP | 2004-248659 | 9/2004 | |
| JP | 2005168477 A * | 6/2005 | ............... A23F 3/14 |
| JP | 2005-333862 | 12/2005 | |
| JP | 2006166770 A * | 6/2006 | ............... A23L 2/52 |
| JP | 2007-244310 | 9/2007 | |
| JP | 2008-161094 | 7/2008 | |
| JP | 2010-268714 | 12/2010 | |
| JP | 2012-60928 | 3/2012 | |
| JP | 2014-198039 | 10/2014 | |
| JP | 2015122970 A * | 7/2015 | ............... A23L 2/00 |
| WO | 2009/136610 | 11/2009 | |

OTHER PUBLICATIONS

Kondo M. et al. JP-2005168477-A, Machine Translation English, Jun. 30, 2005 (Year: 2005).*
Hosoya N. et al., JP 2006166770, English Translation Machine, Jun. 29, 2006, pp. 1-8. (Year: 2006).*
Takatsu H. JP 2015122970, English Translation Machine, Jul. 6, 2015, pp. 1-15. (Year: 2015).*
International Preliminary Report on Patentability and Written Opinion of the International Searching Authority issued Mar. 23, 2021 in International (PCT) Application No. PCT/JP2019/036359.
Supplementary European Search Report issued Jun. 3, 2022 in corresponding European Patent Application No. 19869006.
International Search Report (ISR) issued Oct. 21, 2019 in International (PCT) Application No. PCT/JP2019/036359.
Yan Hu, "Research progress in the reasons and solutions of tea liquor browning", Science and Technology of Food Industry, vol. 38, No. 10, 2017, pp. 373-378.
China Beverage Industry Association, "Beverage Production Worker", China Light Industry Press Ltd., 2010.1, p. 21-22, ISBN 978-7-5019-7124-4, with partial English translation.

* cited by examiner

Primary Examiner — Hong T Yoo
(74) Attorney, Agent, or Firm — Wenderoth, Lind & Ponack, L.L.P.

(57) ABSTRACT

Provided is a green tea-containing beverage including: (A) green tea; (B) at least one selected from the group consisting of phytic acid, tartaric acid, and gluconic acid; and (C) at least one selected from the group consisting of ascorbic acid, a salt of ascorbic acid, erythorbic acid, and a salt of erythorbic acid, wherein the green tea-containing beverage has a copper content of 0.3 mg/L or more. Preferably, the concentration of the constituent (B) is 0.05-2.5 g/L. Preferably, the concentration of the constituent (C) is 0.2-5 g/L. Preferably the green tea-containing beverage further includes alcohol. Also provided is a method for preventing discoloration of a green tea-containing beverage, the method including: incorporating the constituents (B) and (C) in the green tea-containing beverage; and further incorporating copper so as to give the copper content of 0.3 mg/L or more.

12 Claims, 1 Drawing Sheet

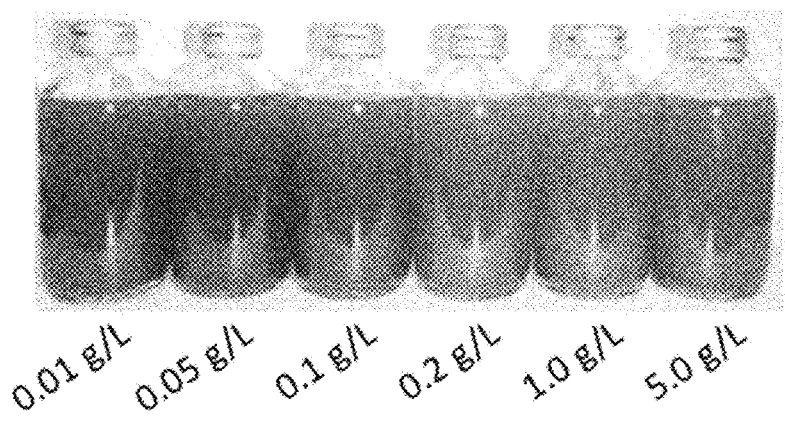

GREEN TEA-CONTAINING BEVERAGE, METHOD FOR PREVENTING DISCOLORATION OF GREEN TEA-CONTAINING BEVERAGE, AND METHOD FOR MANUFACTURING GREEN TEA-CONTAINING BEVERAGE

TECHNICAL FIELD

The present invention relates to a green tea-containing beverage, a method for preventing discoloration of a green tea-containing beverage, and a method for producing a green tea-containing beverage. The green tea-containing beverage of the present invention is of high quality in that it prevents discoloration of green tea pigments, is vivid in color and has a good flavor as compared to the conventional green tea-containing beverage.

BACKGROUND ART

Green tea-containing beverages which contain tea materials such as green tea leaves are known. In general, when green tea is used as a material for a beverage, the challenge is that chlorophyll which is contained in green tea changes due to the effect of the temperature, the pH, light and the like, which results in fading or discoloration of the beverage.

Technologies to prevent discoloration of tea materials include those as recited in Patent Documents 1-3, for example. Patent Document 1 discloses matcha (powdered green tea) having improved preservability characterized in that cyclodextrin is blended with matcha. Patent Document 2 discloses matcha powder whose discoloration and fading are prevented by attaching magnesium compounds to the surface of matcha powder, and a method for producing the same. Patent Document 3 discloses green tea wherein an alkaline solution is added thereto to give excellent green color tone stability and flavor stability to the green tea upon preservation without deteriorating a flavor and other active constituents that the green tea originally has.

PRIOR ART DOCUMENTS

Patent Documents

Patent Document 1: JP 62-19051 A
Patent Document 2: JP 2012-60928 A
Patent Document 3: JP 2014-198039 A

DISCLOSURE OF INVENTION

Technical Problem

However, a technology to prevent discoloration of a beverage which contains green tea (a green tea-containing beverage) has not been necessarily fully considered. Therefore, an object of the present invention is to provide a high quality green tea-containing beverage that prevents discoloration of green tea pigments, is vivid in color and has a good flavor in the light of the above-mentioned problems that the conventional art has.

Solution to Problem

The present inventors found that the greenness of green tea pigments in a green tea-containing beverage can be stably retained over time by using phytic acid, tartaric acid or gluconic acid (Constituent (B)) and ascorbic acid or erythorbic acid or salts thereof (Constituent (C)) in combination, and further, by giving it a predetermined value or more of a copper content. Moreover, the present inventors found that this effect is exhibited even in the form of a green tea-containing alcohol beverage which contains alcohol. In addition, the present inventors succeeded in providing a high quality green tea-containing beverage which has a green vivid appearance and has a good flavor.

One aspect of the present invention is a green tea-containing beverage including: (A) green tea; (B) at least one selected from the group consisting of phytic acid, tartaric acid, and gluconic acid; and (C) at least one selected from the group consisting of ascorbic acid, a salt of ascorbic acid, erythorbic acid, and a salt of erythorbic acid, wherein the green tea-containing beverage has a copper content of 0.3 mg/L or more.

Preferably, the concentration of the constituent (B) is 0.05-2.5 g/L.

Preferably, the concentration of the constituent (C) is 0.2-5 g/L.

Preferably, the green tea-containing beverage further includes alcohol and has an alcohol concentration of 1-60 v/v %.

Preferably, the green tea is matcha.

Preferably, the constituent (B) is phytic acid, and the constituent (C) is ascorbic acid or a salt of ascorbic acid.

Preferably, the constituent (B) is phytic acid, the concentration of the constituent (B) is 0.05-2.5 g/L, the constituent (C) is ascorbic acid or a salt of ascorbic acid, the concentration of the constituent (C) is 0.2-5 g/L, the green tea-containing beverage further includes alcohol and has an alcohol concentration of 1-60 v/v %, and the green tea is matcha.

Another aspect of the present invention is a method for preventing discoloration of a green tea-containing beverage, the method including: incorporating in the green tea-containing beverage: (B) at least one selected from the group consisting of phytic acid, tartaric acid, and gluconic acid; and (C) at least one selected from the group consisting of ascorbic acid, a salt of ascorbic acid, erythorbic acid, and a salt of erythorbic acid; and further incorporating copper in the green tea-containing beverage so as to give a copper content of 0.3 mg/L or more.

Preferably, the constituent (B) is incorporated so as to give its final concentration of 0.05-2.5 g/L.

Preferably, the constituent (C) is incorporated so as to give its final concentration of 0.2-5 g/L.

Preferably, the green tea-containing beverage further includes alcohol and has an alcohol concentration of 1-60 v/v %.

Preferably, the green tea is matcha.

Preferably, the constituent (B) is phytic acid, and the constituent (C) is ascorbic acid or a salt of ascorbic acid.

Preferably, the constituent (B) is phytic acid, the constituent (B) is incorporated so as to give its final concentration of 0.05-2.5 g/L, the constituent (C) is ascorbic acid or a salt of ascorbic acid, the constituent (C) is incorporated so as to give its final concentration of 0.2-5 g/L, the green tea-containing beverage further includes alcohol and has an alcohol concentration of 1-60 v/v %, and the green tea is matcha.

Another aspect of the present invention is a method for producing the green tea-containing beverage described above, the method including: providing green tea obtained by a method which includes bringing green tea materials into contact with copper; and using the green tea as the constituent (A).

Preferably, the green tea is matcha.

Effect of Invention

According to the present invention, a green tea-containing beverage which prevents discoloration of green tea pigments, is vivid in color and has a good flavor can be provided.

BRIEF DESCRIPTION OF DRAWINGS

FIG. 1 is a photograph representing the appearance of 6 types of green tea-containing alcohol beverages prepared in EXAMPLE 1-2.

BEST MODE FOR CARRYING OUT THE INVENTION

A green tea-containing beverage of the present invention includes: (A) green tea; (B) at least one selected from the group consisting of phytic acid, tartaric acid, and gluconic acid; and (C) at least one selected from the group consisting of ascorbic acid, a salt of ascorbic acid, erythorbic acid, and a salt of erythorbic acid, and has a specific amount or more of copper content. Also, a method for preventing discoloration of the green tea-containing beverage of the present invention includes incorporating the constituent (B) and the constituent (C) in the green tea-containing beverage, and further incorporating copper therein so as to give a specific amount or more of copper content.

"Green tea" in the present invention refers to, among tea made from *Camellia sinensis* leaves, tea in which picked tea leaves have been heat-treated to prevent them from fermentation. Green tea is classified in unfermented tea (non-fermented tea). Examples of green tea include matcha, sencha (unshaded green tea) and gyokuro (shaded green tea). In the present invention, green tea which has a green vivid appearance is preferably adopted, and matcha is particularly preferably adopted.

"Matcha" in the present invention has the same definition as that of typical matcha, and refers to tea which is obtained by: growing raw tea leaves under the light shielding condition; steaming and drying them to obtain tencha (matcha materials); and finely grinding them by stone milling and the like. Matcha may also be obtained by finely grinding tencha with machine milling by Masscolloider and colloid mills, in addition to stone milling.

Although a form of green tea used in production of the green tea-containing beverage of the present invention is not specifically limited, for example, green tea having a powdered form, a liquid form, or a pasty form can be appropriately selected and used.

While a green tea content of the green tea-containing beverage of the present invention is not specifically limited, it can be appropriately selected from the range in which the green tea has a green vivid appearance, for example, the range of 0.3-20 g/L.

In order to achieve a predetermined copper content in the green tea-containing beverage of the present invention, it is preferable that green tea which contains copper of 10 ppm (mg/kg) or more is used. It is more preferable that green tea which contains copper of 100 ppm (mg/kg) or more is used. Such green tea can be obtained by a method which includes bringing green tea materials (for example, raw tea leaves, tencha) into contact with copper. For example, it can be obtained by a method which includes treating green tea materials for a predetermined time in a metallic container made up of a copper-containing metal while being heated as needed.

The green tea-containing beverage of the present invention has a copper content of 0.3 mg/L or more. When it has the copper content of less than 0.3 mg/L, the green vivid appearance in the green tea-containing beverage may be deteriorated. Meanwhile, the allowable upper limit of copper in dietary reference intakes for Japanese is 10 mg/day. Moreover, we have confirmed that the discoloration prevention effect of green tea pigments can be exhibited up to the copper content of 20 mg/L in the green tea-containing beverage.

The constituent (B) is at least one selected from the group consisting of phytic acid, tartaric acid, and gluconic acid.

Phytic acid, which is one of the constituents (B), is a hexaphosphate ester of myo-inositol, and CAS Registry Number 83-86-3 is assigned to the substance.

Tartaric acid, which is one of the constituents (B), refers to L-tartaric acid. Tartaric acid is a hydroxy acid abundantly contained in acid fruit, especially grapes, and wine.

Gluconic acid, which is one of the constituents (B), is a carboxylic acid formed by an oxidation of the first carbon of glucose, and CAS Registry Number 526-95-4 is assigned to the substance.

As for the content of the constituent (B) in the present invention, although the range is not specifically limited as long as the discoloration prevention effect of green tea pigments is exhibited, the range is preferably 0.05-2.5 g/L, more preferably 0.05-2 g/L and further preferably 0.05-1 g/L. When the content of the constituent (B) is less than 0.05 g/L, the discoloration prevention effect may be lowered. When the content of the constituent (B) is more than 2.5 g/L, the beverage may have a distinctive sour taste (too strong sour taste).

When tartaric acid is used as the constituent (B), a salt of tartaric acid may be substituted for tartaric acid in part. When gluconic acid is used as the constituent (B), a salt of gluconic acid can be substituted for gluconic acid in part.

As for the constituent (B), phytic acid or tartaric acid is preferably used in terms of a sensory aspect, and phytic acid which has no distinctive sour taste (not too strong sour taste) is especially preferably used.

The constituent (C) is at least one selected from the group consisting of ascorbic acid, a salt of ascorbic acid, erythorbic acid, and a salt of erythorbic acid.

Ascorbic acid, which is one of the constituents (C), refers to L-ascorbic acid. Ascorbic acid is one type of water-soluble vitamins and is a substance also referred to as Vitamin C. A salt of ascorbic acid includes sodium ascorbate, for example.

Erythorbic acid, which is one of the constituents (C), is a stereoisomer of L-ascorbic acid and is a substance used in food additives as an antioxidant. A salt of erythorbic acid includes sodium erythorbate, for example.

As for the content of the constituent (C) in the present invention, although the range is not specifically limited as long as the discoloration prevention effect of green tea pigments is exhibited, the range is preferably 0.2-5 g/L, more preferably 0.2-3 g/L and further preferably 0.2-1 g/L. When the content of the constituent (C) is less than 0.2 g/L, the discoloration prevention effect may be lowered. When the constituent (C) is more than 5 g/L, the beverage may have a distinctive sour taste (too strong sour taste).

The green tea-containing beverage of the present invention may contain other constituents, for example, food additives such as flavors, sugar, sweeteners and acidulants, as needed.

In order to achieve a predetermined copper content, colorants such as copper chlorophyll and sodium copper chlorophyllin may be added to the green tea-containing beverage of the present invention. For example, these colorants can be used in combination with the above-described green tea containing copper of 10 ppm (mg/kg) or more.

The green tea-containing beverage of the present invention can be taken as it is; can be taken by diluting with water; can be taken by diluting with carbonated water, etc., and is of high versatility. The green tea-containing beverage of the present invention has good preservability, prevents discoloration of green tea pigments and can stably keep the green vivid appearance.

In a preferred embodiment, the green tea-containing beverage of the present invention further contains alcohol. In the following, the beverage of the present invention may be referred to as "a green tea-containing alcohol beverage". Meanwhile, in the present specification, "the alcohol concentration" refers to the concentration of ethyl alcohol (ethanol). In other words, when "alcohol" is described in the present specification, it refers to ethyl alcohol (ethanol) unless otherwise specified.

"The green tea-containing alcohol beverage" in the present invention is an alcohol beverage which contains green tea. The alcohol beverage is, for example, such that green tea such as matcha and water are mixed with alcohol materials, and food additives such as flavors, sugar, sweeteners, acidulants and other materials are further mixed therewith, as necessary. By way of a specific example, the green tea-containing alcohol beverages include green tea-containing spirits and liqueurs such as so-called chu-hai (shochu (Japanese distilled spirits)-highball), cocktails, fizzes, and wine coolers. While alcohol materials are not specifically limited, they include brewed alcohol, spirits (such as rum, vodka, gin), liqueurs, whiskey, brandies or shochu (including continuous distilled shochu and single distilled shochu), for example, and further, may be brewages such as Japanese sake, wine, and beer. Although these alcohol materials can be used individually or in combination, respectively, it is preferable that alcohol materials are selected so as to take advantage of respective flavors. A more preferable form includes the green tea-containing alcohol beverage being used as liqueur and chu-hai.

Although the alcohol concentration of the green tea-containing alcohol beverage of the present invention may be appropriately selected depending on the above-described forms, for example, the concentration is typically in the range of 1-60 v/v %. For example, in the case of liqueur, the alcohol concentration includes the range of 10-60 v/v %. Especially preferable is the case where the alcohol concentration is 10 v/v % or more because excessive heat sterilization may not be performed, which makes the green appearance more vivid. In the case of chu-hai, the alcohol concentration includes the range of 1-10 v/v %. Meanwhile, in order to produce chu-hai, carbonation is applied to a mixture obtained by mixing respective materials to contain carbon dioxide gas in the mixture so that a sparkling green tea-containing alcohol beverage can be obtained. In a preferred embodiment, the gas volume of the sparkling green tea-containing alcohol beverage is 1.5-3.5. Meanwhile, the pH of the green tea-containing alcohol beverage of the present invention is preferably 3.5 or more and less than 4.0, and more preferably 3.6 or more and less than 3.8. In the case where the pH is less than 4.0 and more preferably, the pH is less than 3.8, the green tea-containing alcohol beverage having a green vivid appearance and a good flavor can be made because excessive heat sterilization may not be performed.

The green tea-containing alcohol beverage of the present invention may contain other constituents as necessary. For example, it may further contain sugar. As sugar, one utilized for typically producing liqueur, chu-hai, and fruit mixed alcohol can be used. Specifically, glucose, fructose, granulated sugar, glucose fructose liquid sugar, fructose glucose liquid sugar, sucrose liquid sugar, crystal sugar, brown sugar, honey and the like can be used.

The green tea-containing alcohol beverage of the present invention can be produced by: to material alcohol, adding green tea such as matcha, the constituents (B) and (C); further adding other materials such as sugar, flavors as needed; and adding water so as to give a desired alcohol concentration. In order to achieve a predetermined copper content, green tea obtained by the above-mentioned method which includes bringing green tea materials into contact with copper can be used, or colorants such as copper chlorophyll can be used.

Meanwhile, in the case of liqueur, it may be taken with milk by adding cow milk (milk), in addition to being taken as it is by adding ice, or being taken by diluting with water. The green tea-containing alcohol beverage of the present invention neither creates precipitates easily nor deteriorates its appearance even if the beverage is used for liqueur with milk.

The green tea-containing alcohol beverage of the present invention can be taken as it is by adding ice; can be taken by diluting with water, etc. Further, in the case where no carbon dioxide gas is contained in the beverage, it can be taken by diluting with carbonated water; can be taken by diluting with milk, etc. The green tea-containing alcohol beverage of the present invention has good preservability, prevents discoloration of green tea pigments and can stably keep the green vivid appearance.

The green tea-containing beverage of the present invention is also useful as a diluting material (a mixer). Shochu diluted with matcha is taken as one example. In general, when shochu diluted with matcha is offered in a restaurant, matcha powder is dissolved into water, followed by mixing shochu therewith on site. That is, because matcha discolors after one day or so once it is dissolved into water, matcha powder is dissolved into water in each case. However, when the green tea-containing beverage (the matcha-containing beverage) of the present invention is used as a diluting material to mix shochu into it to prepare shochu with matcha, there is no need to dissolve matcha powder into water each time. The green tea-containing beverage of the present invention has good preservability, prevents discoloration of green tea pigments and can stably keep the green vivid appearance, which allows the use as such a diluting material.

Further, when the diluting material is used in the form of the green tea-containing alcohol beverage, there is no need to additionally use shochu and the like. For example, by adding ice to such a diluting material, this can be provided as the green tea-containing alcohol beverage as it is. Also, by diluting such a diluting material with water, this can be provided as the green tea-containing alcohol beverage. Further, by diluting such a diluting material with carbonated water, this can be provided as a sparkling green tea-containing alcohol beverage. Moreover, by diluting such a diluting material with milk, this can be provided as the green tea-containing alcohol beverage with milk.

Evaluation of how the green appearance is vivid can be performed by using a spectrophotometer or a chroma meter. For example, by using a chroma meter, the vividness can be evaluated with numerical values converted by the L*a*b* color system. Here, the L* value is the lightness which represents the brightness of color and takes numerical values of 0-100. The greater the numerical value is, the higher the lightness is. Both the a* and b* values are chromaticities which represent the magnitude of color. When the a* value heads toward the (+) direction, red is intensified, and when the a* value heads toward the (−) direction, green is intensified. When the b* value heads toward the (+) direction, yellow is intensified, and when the b* value heads toward the (−) direction, blue is intensified. We have confirmed that even after the green tea-containing beverage of the present invention had been preserved for a period corresponding to one year at ordinary temperature, there were no changes for the a* and b* values virtually.

As described above, the present invention prevents discoloration of green tea pigments, which results in a vivid color. Its mechanism is considered as follows. More specifically, discoloration and fading are caused by two points: discoloration occurs when chlorophyll of green tea pigments is decomposed into pheophytin; and fading occurs when colorless catechin contained in green tea is oxidized to theaflavins and thearubigins which bring a reddish-brown or dark-brown color. As for the former, it is presumed that discoloration in chlorophyll's green color can be prevented by giving the copper content of 0.3 mg/L or more. As for the latter, it is presumed that the oxidation reaction of catechin can be greatly suppressed by the chelating ability of phytic acid, tartaric acid or gluconic acid. Further, it is presumed that the occurrence of fading can be nearly avoided by adding ascorbic acid or erythorbic acid or salts thereof which has an antioxidative ability.

In the following, the present invention is specifically explained using examples, but the present invention is not limited to these examples.

Example 1

[Example 1-1] Validation of the Effect from Phytic Acid

In order to study the discoloration prevention effect of green tea pigments from phytic acid in a green tea-containing alcohol beverage using matcha, five types of liqueurs having the composition shown in Table 1 and having different phytic acid contents were produced (alcohol concentration: 12.4 v/v %). The phytic acid concentration was set at 0.025 g/L, 0.05 g/L, 0.25 g/L, 0.5 g/L or 2.5 g/L. As matcha, one obtained by a method which included bringing matcha materials into contact with copper was used. Meanwhile, the copper content of each liqueur was 2.3 mg/L.

[Table 1]

TABLE 1

| Materials | Amount blended |
|---|---|
| 67 v/v % Alcohol (mL) | 185 |
| Matcha powder (g) | 2 |
| Glucose fructose liquid sugar (g) | 50 |
| Flavors (g) | 0.02 |

TABLE 1-continued

| Materials | Amount blended |
|---|---|
| Phytic acid (g) | 0.025-2.5 |
| Deionized water | Remainder |
| Total (mL) | 1000 |

After the respective green tea-containing alcohol beverages were preserved for 4 days at 40° C. (equivalent to one month at ordinary temperature), the discoloration prevention effects and tastes were evaluated by 10 skilled panelists. As a result, all the 10 panelists had an excellent evaluation that the green tea-containing alcohol beverages with the phytic acid concentration in the range of 0.05-2.5 g/L prevented discoloration and also tasted good, as compared to those before preservation.

[Example 1-2] Validation of the Effect from Phytic Acid and Ascorbic Acid <1>

In order to study the discoloration prevention effect of green tea pigments from phytic acid and ascorbic acid in a green tea-containing alcohol beverage using matcha, six types of liqueurs (green tea-containing alcohol beverages) having the composition shown in "EXAMPLE 1-2" of Table 2 and having different ascorbic acid contents were produced (alcohol concentration: 12.4 v/v %). The ascorbic acid concentration was set at 0.01 g/L, 0.05 g/L, 0.1 g/L, 0.2 g/L, 1.0 g/L or 5.0 g/L. As matcha, one obtained by a method which included bringing matcha materials into contact with copper was used. Meanwhile, the copper content of each liqueur was 5.8 mg/L.

After each liqueur (the green tea-containing alcohol beverage) was preserved for 13 days at 40° C. (equivalent to four months at ordinary temperature), the discoloration prevention effects and the tastes were evaluated by 10 skilled panelists. As a result, all the 10 panelists had an excellent evaluation that the green tea-containing alcohol beverages with the ascorbic acid concentration in the range of at least 0.2-5.0 g/L prevented discoloration and also tasted good, as compared to those before preservation.

FIG. 1 is a photograph representing the appearance of each liqueur whose color tone contained in a colorless transparent vial was observed. In FIG. 1, each liqueur having the ascorbic acid concentration of 0.01 g/L, 0.05 g/L, 0.1 g/L, 0.2 g/L, 1.0 g/L, 5.0 g/L is represented from the left. As shown in FIG. 1, discoloration was prominently suppressed and vivid green was retained especially in the range of the ascorbic acid concentration of 0.2-5.0 g/L.

[Example 1-3] Validation of the Effect from Phytic Acid and Ascorbic Acid <2>

Liqueur (a green tea-containing alcohol beverage) having the composition shown in "EXAMPLE 1-3" of Table 2 was produced (alcohol concentration: 12.4 v/v %, pH: 3.6). The copper content of the liqueur was 2.3 mg/L.

After the green tea-containing alcohol beverage was preserved for 13 days at 40° C. (equivalent to four months at ordinary temperature), the discoloration prevention effect and the taste were evaluated by 10 skilled panelists. As a result, all the 10 panelists had an excellent evaluation that the green tea-containing alcohol beverage prevented discoloration and tasted good, as compared to one before preservation.

[Example 1-4] Validation of the Effect from Tartaric Acid and Ascorbic Acid

In order to study the discoloration prevention effect of green tea pigments from tartaric acid and ascorbic acid in a green tea-containing alcohol beverage using matcha, six types of liqueurs (green tea-containing alcohol beverages) having the composition shown in "EXAMPLE 1-4" of Table 2 and having different ascorbic acid contents were produced (alcohol concentration: 12.4 v/v %). The ascorbic acid concentration was set at 0.01 g/L, 0.05 g/L, 0.1 g/L, 0.2 g/L, 1.0 g/L or 5.0 g/L. As matcha, one obtained by a method which included bringing matcha materials into contact with copper was used. Meanwhile, the copper content of each liqueur was 5.8 mg/L. Meanwhile, 0.35 g for the amount of tartaric acid was adopted as a value giving the same pH as that of the liqueur of EXAMPLE 1-2.

After each liqueur (the green tea-containing alcohol beverage) was preserved for 13 days at 40° C. (equivalent to four months at ordinary temperature), the discoloration prevention effects and the tastes were evaluated by 10 skilled panelists. As a result, all the 10 panelists had an excellent evaluation that the green tea-containing alcohol beverages prevented discoloration and tasted good with the ascorbic acid concentration in the range of at least 0.2-5.0 g/L, as compared to those before preservation.

[Example 1-5] Validation of the Effect from Gluconic Acid and Ascorbic Acid

In order to study the discoloration prevention effect of green tea pigments from gluconic acid and ascorbic acid in a green tea-containing alcohol beverage using matcha, six types of liqueurs (green tea-containing alcohol beverages) having the composition shown in "EXAMPLE 1-5" of Table 2 and having different ascorbic acid contents were produced (alcohol concentration: 12.4 v/v %). The ascorbic acid concentration was set at 0.01 g/L, 0.05 g/L, 0.1 g/L, 0.2 g/L, 1.0 g/L or 5.0 g/L. As matcha, one obtained by a method which included bringing matcha materials into contact with copper was used. Meanwhile, the copper content of each liqueur was 5.8 mg/L. Meanwhile, 1.5 g for the amount of gluconic acid was adopted as a value giving the same pH as that of the liqueur of EXAMPLE 1-2.

After each liqueur (the green tea-containing alcohol beverage) was preserved for 13 days at 40° C. (equivalent to four months at ordinary temperature), the discoloration prevention effects and the tastes were evaluated by 10 skilled panelists. As a result, all the 10 panelists had an excellent evaluation that the green tea-containing alcohol beverages prevented discoloration and tasted good with the ascorbic acid concentration in the range of at least 0.2-5.0 g/L, as compared to those before preservation.

[Table 2]

TABLE 2

| Materials | Amount blended | | | |
|---|---|---|---|---|
| | EXAMPLE 1-2 | EXAMPLE 1-3 | EXAMPLE 1-4 | EXAMPLE 1-5 |
| 67 v/v % Alcohol (mL) | 185 | 185 | 185 | 185 |
| Matcha powder (g) | 5 | 2 | 5 | 5 |
| Glucose fructose liquid sugar (g) | 50 | 50 | 50 | 50 |
| Flavors (g) | 0.02 | 0.02 | 0.02 | 0.02 |
| Phytic acid (g) | 0.25 | 0.25 | — | — |
| Tartaric acid (g) | — | — | 0.35 | — |
| Gluconic acid (g) | — | — | — | 1.5 |
| Ascorbic acid (g) | 0.01-5.0 | 0.5 | 0.01-5.0 | 0.01-5.0 |
| Deionized water | Remainder | Remainder | Remainder | Remainder |
| Total (mL) | 1000 | 1000 | 1000 | 1000 |

Example 2

In the composition of EXAMPLE 1-3, the amount of the 67 v/v % alcohol and deionized water being blended was adjusted so as to give the alcohol concentration of 5 v/v %. Carbonation was applied to the blend to contain carbon dioxide gas so that a sparkling green tea-containing chu-hai was prepared. The gas volume of the obtained sparkling green tea-containing chu-hai was 1.8, the pH was 3.6, and the copper content was 2.3 mg/L.

After the obtained sparkling green tea-containing chu-hai was preserved for 13 days at 40° C. (equivalent to four months at ordinary temperature), a sensory evaluation test was performed by 10 skilled panelists. As a result, all the 10 panelists had an excellent evaluation that the chu-hai had a green vivid appearance, prevented discoloration of green tea pigments, also had a mild flavor and tasted good, as compared to one before preservation.

The hue of the obtained sparkling green tea-containing chu-hai was evaluated by a L*a*b* color system with the use of Chroma meter CR5 (manufactured by Konica Minolta, Inc.). As a result, the L*, a* and b* values of the sparkling green tea-containing chu-hai before preservation were 22.42, −7.50, and 24.87, respectively. The L*, a* and b* values of one after preservation were 21.40, −7.62, and 24.83, respectively, and there were virtually no changes as compared to those before preservation.

Example 3

Matcha having the copper content of 1150 mg/kg, which was obtained by a method which included bringing matcha materials into contact with copper, was used to prepare a green tea-containing beverage with the composition shown in Table 3 (EXAMPLE 3). As a control, commercially available common matcha was used (COMPARATIVE EXAMPLE 3). The pH of the green tea-containing beverage in EXAMPLE 3 was 3.6, and the pH of the green tea-containing beverage in COMPARATIVE EXAMPLE was also 3.6. Further, the copper content of the green tea-containing beverage in EXAMPLE 3 was 5.8 mg/L, and the copper content of the green tea-containing beverage in COMPARATIVE EXAMPLE was 0.03 mg/L.

[Table 3]

TABLE 3

| Materials | Amount blended |
|---|---|
| Matcha powder (g) | 5 |
| Glucose fructose liquid sugar (g) | 50 |
| Flavors (g) | 0.02 |
| Phytic acid (g) | 0.25 |
| Ascorbic acid (g) | 0.3 |
| Deionized water (g) | Remainder |
| Total (mL) | 1000 |

The respective green tea-containing beverages were preserved for 13 days at 40° C. (equivalent to 4 months at ordinary temperature). The discoloration prevention effects and the tastes of the green tea-containing beverages in EXAMPLE 3 were evaluated by 10 skilled panelists. As a result, all the 10 panelists had an excellent evaluation that the green tea-containing beverage prevented discoloration, had a green vivid appearance and also tasted good, as compared to one before preservation. On the other hand, the green tea-containing beverage in COMPARATIVE EXAMPLE 3 had a change in color from green to brownish after preservation.

The L*, a* and b* values of the green tea-containing beverage in EXAMPLE 3 before preservation were 25.45, −8.92, and 28.70, respectively. The L*, a* and b* values of the green tea-containing beverage in EXAMPLE 3 after preservation were 23.57, −8.30, and 27.51, respectively, and there were virtually no changes as compared to those before preservation.

On the other hand, the L*, a* and b* values of the green tea-containing beverage in COMPARATIVE EXAMPLE 3 before preservation were 24.45, −8.07, and 29.70, respectively. The L*, a* and b* values of the green tea-containing beverage in COMPARATIVE EXAMPLE 3 after preservation were 24.43, 1.87, and 27.38, respectively and the a* value headed toward the (+) direction where red is intensified.

Example 4

Tencha was extracted with warm water while it was brought into contact with copper to prepare a green tea liquid extract having the copper content of 12 mg/L. The green tea liquid extract was used to prepare a green tea-containing beverage with the composition shown in Table 4 (EXAMPLE 4). As a control, commercially available common matcha was used to perform the similar operation (COMPARATIVE EXAMPLE 4). The pH of the green tea-containing beverage in EXAMPLE 4 was 3.6, and the pH of the green tea-containing beverage in COMPARATIVE EXAMPLE 4 was also 3.6. Further, the copper content of the green tea-containing beverage in EXAMPLE 4 was 0.6 mg/L, and the copper content of the green tea-containing beverage in COMPARATIVE EXAMPLE 4 was 0.01 mg/L.

[Table 4]

TABLE 4

| Materials | Amount blended |
|---|---|
| Green tea liquid extract (g) | 50 |
| Phytic acid (g) | 0.25 |
| Ascorbic acid (g) | 0.3 |
| Deionized water | Remainder |
| Total (mL) | 1000 |

The respective green tea-containing beverages were preserved for 13 days at 40° C. (equivalent to 4 months at ordinary temperature). The discoloration prevention effect and the taste of the green tea-containing beverage in EXAMPLE 4 were evaluated by 10 skilled panelists. As a result, all the 10 panelists had an excellent evaluation that the green tea-containing beverage prevented discoloration, had a green vivid appearance and also tasted good, as compared to one before preservation. On the other hand, the green tea-containing beverage in COMPARATIVE EXAMPLE 4 had a change in color from green to brownish after preservation.

Example 5

The green tea liquid extract (copper content of 12 mg/L) prepared in EXAMPLE 4 was used to produce liqueur of a green tea-containing alcohol beverage (alcohol concentration: 10.0 v/v %, pH: 3.6) with the composition shown in Table 5 (EXAMPLE 5). The copper content of this liqueur was 0.6 mg/L.

[Table 5]

TABLE 5

| Materials | Amount blended |
|---|---|
| 67 v/v % Alcohol (mL) | 150 |
| Green tea liquid extract (g) | 50 |
| Glucose fructose liquid sugar (g) | 30 |
| Flavors (g) | 0.02 |
| Phytic acid (g) | 0.3 |
| Ascorbic acid (g) | 0.3 |
| Deionized water (g) | Remainder |
| Total (mL) | 1000 |

After the green tea-containing alcohol beverage in EXAMPLE 5 was preserved for 13 days at 40° C. (equivalent to four months at ordinary temperature), the discoloration prevention effect and the taste were evaluated by 10 skilled panelists. As a result, all the 10 panelists had an excellent evaluation that the green tea-containing alcohol beverage prevented discoloration, had a green vivid appearance and also tasted good, as compared to one before preservation.

The L*, a* and b* values of the green tea-containing alcohol beverage in EXAMPLE 5 before preservation were 21.31, −4.68, and 12.72, respectively. The L*, a* and b* values of the green tea-containing alcohol beverage in EXAMPLE 5 after preservation were 21.42, −4.94, and 12.73, respectively and there were virtually no changes as compared to those before preservation.

Example 6

A matcha paste (containing 20 w/w % matcha) was used to produce liqueur of a green tea-containing alcohol beverage with the composition shown in Table 6 (alcohol concentration: 25.0 v/v %, pH: 3.7) (EXAMPLE 6), wherein the matcha paste contained matcha obtained by a method which included bringing matcha materials into contact with copper, and wherein the matcha paste had the copper content of 250 mg/kg. This liqueur had the copper content of 3.8 mg/L. The green tea-containing alcohol beverage in EXAMPLE 6 was assumed to be used as a diluting material.

[Table 6]

TABLE 6

| Materials | Amount blended |
|---|---|
| 67 v/v % Alcohol (mL) | 375 |
| Matcha paste (g) | 15 |
| Glucose fructose liquid sugar (g) | 60 |
| Flavors (g) | 0.03 |
| Phytic acid (g) | 0.3 |
| Ascorbic acid (g) | 0.2 |
| Deionized water (g) | Remainder |
| Total (mL) | 1000 |

The green tea-containing alcohol beverage in EXAMPLE 6 was preserved for 13 days at 40° C. (equivalent to 4 months at ordinary temperature). The green tea-containing alcohol beverage in EXAMPLE 6 before preservation was diluted four-fold with water to give a first beverage. Also, the green tea-containing alcohol beverage in EXAMPLE 6 after preservation was diluted four-fold with water to give a second beverage. Ice was added to the first and second beverages. Both of the first and second beverages with ice were totally comparable with the alcohol beverages with matcha offered in a restaurant.

The L*, a* and b* values of the green tea-containing alcohol beverage in EXAMPLE 6 before preservation were 20.56, −8.02, and 25.31, respectively. The L*, a* and b* values of the green tea-containing alcohol beverage in EXAMPLE 6 after preservation were 18.96, −8.22, and 24.22, respectively and there were virtually no changes as compared to those before preservation.

The similar consideration was performed with respect to the first and second beverages, the four-fold diluted beverage. The L*, a* and b* values of the first beverage, the diluted beverage before preservation, were 21.61, −5.35, and 16.77, respectively. The L*, a* and b* values of the second beverage, the diluted beverage after preservation, were 21.33, −5.04, and 16.01, respectively, and there were virtually no changes as compared to those before preservation.

Example 7

The matcha paste (containing matcha of 20 w/w %), used in EXAMPLE 6, having the copper content of 250 mg/kg and the green tea liquid extract (copper content of 12 mg/L) prepared in EXAMPLE 4 were used to produce liqueur of a green tea-containing alcohol beverage with the composition shown in Table 7 (alcohol concentration: 25.0 v/v %, pH: 3.6), with which a 900 mL plastic bottle was filled (EXAMPLE 7). This liqueur had the copper content of 15.0 mg/L. The green tea-containing alcohol beverage in EXAMPLE 7 was assumed to be used as a diluting material.

[Table 7]

TABLE 7

| Materials | Amount blended |
|---|---|
| 67 v/v % Alcohol (mL) | 374 |
| Matcha paste (g) | 60 |
| Green tea liquid extract (g) | 4 |
| Glucose fructose liquid sugar (g) | 30 |
| Flavors (g) | 0.05 |
| Phytic acid (g) | 0.9 |
| Ascorbic acid (g) | 0.3 |
| α-Tocopherol (g) | 0.1 |
| Deionized water (g) | Remainder |
| Total (mL) | 1000 |

The green tea-containing alcohol beverage in EXAMPLE 7 before preservation was diluted four-fold with water to give a third beverage. Also, the green tea-containing alcohol beverage in EXAMPLE 7 after preservation was diluted four-fold with water to give a fourth beverage. As a consequence, both of the third and fourth beverages had green vivid appearances and also tasted good. For both of them, very rich matcha taste could be felt and they were totally comparable with the alcohol beverages with matcha offered in a restaurant. The green tea-containing alcohol beverage of this Example saves dissolving matcha powder, allows preparation of an authentic alcohol beverage with matcha in a simple manner by simply diluting with water, and can simplify the on-site operation in restaurants.

The invention claimed is:

1. A green tea-containing beverage comprising:
   (A) green tea;
   (B) at least one selected from the group consisting of phytic acid and tartaric acid; and
   (C) at least one selected from the group consisting of ascorbic acid, a salt of ascorbic acid, erythorbic acid, and a salt of erythorbic acid,
   wherein a concentration of the constituent (B) is 0.05-2.5 g/L,
   wherein a concentration of the constituent (C) is 0.2-5 g/L, and
   wherein the green tea-containing beverage has a copper content of 0.3 mg/L or more and 20 mg/L or less.

2. The green tea-containing beverage according to claim 1, further comprising ethanol and having an ethanol concentration of 1-60 v/v %.

3. The green tea-containing beverage according to claim 2, wherein the green tea is matcha.

4. The green tea-containing beverage according to claim 1, wherein the green tea is matcha.

5. The green tea-containing beverage according to claim 1,
   wherein the constituent (B) is phytic acid, and
   wherein the constituent (C) is ascorbic acid or a salt of ascorbic acid.

6. The green tea-containing beverage according to claim 1,
   wherein the constituent (B) is phytic acid,
   wherein the concentration of the constituent (B) is 0.05-2.5 g/L,
   wherein constituent (C) is ascorbic acid or a salt of ascorbic acid,
   wherein the concentration of the constituent (C) is 0.2-5 g/L,
   wherein the green tea-containing beverage further comprises ethanol and has an ethanol concentration of 1-60 v/v %, and
   wherein the green tea is matcha.

7. A method for preventing discoloration of a green tea-containing beverage, the method comprising:
incorporating in the green tea-containing beverage: (B) at least one selected from the group consisting of phytic acid, tartaric acid, and gluconic acid, wherein the constituent (B) is incorporated so as to give its final concentration of 0.05-2.5 g/L; and (C) at least one selected from the group consisting of ascorbic acid, a salt of ascorbic acid, erythorbic acid, and a salt of erythorbic acid, wherein the constituent (C) is incorporated so as to give its final concentration of 0.2-5 g/L; and
further incorporating copper in the green tea-containing beverage so as to give a copper content of 0.3 mg/L or more and 20 mg/L or less.

8. The method according to claim 7, wherein the green tea-containing beverage further comprises alcohol and has an alcohol concentration of 1-60 v/v %.

9. The method according to claim 7, wherein the green tea is matcha.

10. The method according to claim 7, wherein the constituent (B) is phytic acid, and the constituent (C) is ascorbic acid or a salt of ascorbic acid.

11. The method according to claim 7,
wherein the constituent (B) is phytic acid,
wherein the constituent (B) is incorporated so as to give its final concentration of 0.05-2.5 g/L,
wherein constituent (C) is ascorbic acid or a salt of ascorbic acid,
wherein the constituent (C) is incorporated so as to give its final concentration of 0.2-5 g/L,
wherein the green tea-containing beverage further comprises alcohol and has an alcohol concentration of 1-60 v/v %, and
wherein the green tea is matcha.

12. The method according to claim 8, wherein the green tea is matcha.

* * * * *